United States Patent
Liu et al.

(10) Patent No.: US 11,288,041 B1
(45) Date of Patent: Mar. 29, 2022

(54) EFFICIENT DEFECT LOCATION IN NEW CODE VERSIONS

(71) Applicant: International Business Machines Corporation, Armonk, NY (US)

(72) Inventors: Zhen Liu, Beijing (CN); Jia Tian Zhong, Beijing (CN); Le Chang, Beijing (CN); Ming Lei Zhang, Beijing (CN); Ting Ting Zhan, Beijing (CN); Xiao Yan Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/111,260

(22) Filed: Dec. 3, 2020

(51) Int. Cl.
*G06F 9/44* (2018.01)
*G06F 8/20* (2018.01)
*G06F 11/36* (2006.01)
*G06F 8/71* (2018.01)
*G06F 8/41* (2018.01)

(52) U.S. Cl.
CPC .............. *G06F 8/22* (2013.01); *G06F 8/433* (2013.01); *G06F 8/71* (2013.01); *G06F 11/368* (2013.01); *G06F 11/3608* (2013.01)

(58) Field of Classification Search
None
See application file for complete search history.

(56) References Cited

U.S. PATENT DOCUMENTS 6,016,474 A * 1/2000 Kim ................ G06F 11/3664
709/224

6,634,026 B1 * 10/2003 Jones ................ G06F 8/70
714/E11.209

(Continued)

FOREIGN PATENT DOCUMENTS

CN 106446691 A 2/2017
CN 109388551 A 2/2019

OTHER PUBLICATIONS

"Delta Debugging", Updated: Apr. 5, 2018, 5 pps , Saarland University—Computer Science Saarland Informatics Campus, Campus E9 1 (CISPA), 66123 Saarbrücken, Germany, <https://www.st.cs.uni-saarland.de/dd/>.

(Continued)

*Primary Examiner* — Wei Y Zhen
*Assistant Examiner* — Lanny N Ung
(74) *Attorney, Agent, or Firm* — David K. Mattheis; Maeve M. Carpenter

(57) ABSTRACT

Source code of a golden version and a next version of a program is received in which procedure calls are modified to call from an entry point table (EPT) with index numbers corresponding to procedure memory addresses. An executable defect-free golden version program and next version program with a defect are received. A first entry point table (first EPT) for the new version program and a second EPT for the golden version program are generated. A series of substitutions of procedures from the second EPT to the first EPT is performed and an order of substitutions includes: a module set, a module of the module set, a procedure set of the module, and a procedure of the procedure set. The defect producing procedure is identified by substituting in order until the defect is absent and proceeding to the next substitution in order.

20 Claims, 4 Drawing Sheets

(56) References Cited

U.S. PATENT DOCUMENTS

| | | | | |
|---|---|---|---|---|
| 7,530,056 | B1* | 5/2009 | Yaari | G06F 11/3604 |
| | | | | 717/128 |
| 10,459,695 | B2* | 10/2019 | Hauser | G06F 11/3604 |
| 10,642,716 | B1 | 5/2020 | Yoshida | |
| 2003/0101431 | A1* | 5/2003 | Duesterwald | G06F 8/656 |
| | | | | 717/111 |
| 2005/0149919 | A1* | 7/2005 | Rothman | G06F 8/65 |
| | | | | 717/162 |
| 2006/0048093 | A1* | 3/2006 | Jain | G06F 8/20 |
| | | | | 717/104 |
| 2010/0023934 | A1* | 1/2010 | Sheehan | G06F 8/71 |
| | | | | 717/168 |
| 2012/0310921 | A1* | 12/2012 | Egan | G06F 16/24542 |
| | | | | 707/718 |
| 2017/0212829 | A1 | 7/2017 | Bales | |

OTHER PUBLICATIONS

Alves, "Program Slicing and Debugging", 19 pps., V Encontro Brasilieiro de Testes de Software (EBTS), Recife-PE, Brazil, Apr. 2011, <http://www.slideserve.com/haamid/program-slicing-and-debugging>.

* cited by examiner

EFFICIENT DEFECT LOCATION IN NEW CODE VERSIONS

FIELD OF THE INVENTION

The present invention relates generally to the field of application development debugging, and more particularly to efficiently locating code introducing defects by prioritized substitutions.

BACKGROUND OF THE INVENTION

Software applications can be large and complex in architecture and lines of code. Often, applications are developed that include multiple modules that each perform a particular area of operations or a group of related functions. The modules of an application are parts of a program that are often developed independently and are combined by linking the modules. Modules include one or more procedures, which perform concrete tasks and are referenced or called within the operation of the program.

Software applications are tested in an environment to locate and resolve errors and defects, sometimes referred to as "bugs". Testing environments often include a debugger used to facilitate locating and correcting code defects. Source code includes the programming statements of an application typically created in a text-based programming language and compiled by a compiler function to produce an executable program.

Software applications are often upgraded by modifying or adding to the existing code of the application. Upgrades are referred to as new versions of the software application and may be identified by a version numbering schema. Upgraded software can result in problems with the functions of the previous version, which requires investigation and search to locate and correct defects. Previous versions of the software application that are defect-free are sometimes referred to as golden code or a golden version, whereas the upgraded application can be referred to in brief as the new version of the software application.

SUMMARY

Embodiments of the present invention disclose a method, computer program product, and system for locating a defect in a new version of a software program. The method provides for one or more processors receiving source code of a golden version program and source code of a next version program, which is modified to direct procedure calls within the respective programs to index numbers in an entry point table (EPT), each index number corresponding to a respective procedure memory address. The one or more processors receiving a next version and a golden version of a program in which the next version program is executable, and includes at least one defect, and the golden version program is executable and is defect-free. The one or more processors generating, a first entry point table (first EPT) for the new version program and a second entry point table (second EPT) for the golden version program. The one or more processors performing a series of substitutions of procedures from the second EPT of the golden version program to the first EPT of the new version program, wherein the series of substitutions of procedures includes an order of a module set, an individual module of the module set, a procedure set of the individual module, and an individual procedure of the procedure set, and the one or more processors identifying the individual procedure determined to produce the defect by performing a substitution of the order until the defect is observed to be absent and proceeding to a next substitution of the order.

Embodiments of the present invention also disclose a method, computer program product, and computer system for determining an order of substitution for identifying a procedure of a new version of a program producing a defect. The method provides for one or more processors determining factors associated with a new version of a program related to the occurrence of a defect. The one or more processors determining a weight of the factors for modules of the new version program, respectively, and a weight of the factors for procedures of respective modules. The one or more processors receiving a module calling tree and a procedure calling tree of the new version program.

The one or more processors determining a substitution priority value for a module set in a call sequence identified by the module calling tree, based on the weight of the respective modules included in the module set of the new version program. The one or more processors determining a substitution order of the module set of the new version program with a corresponding set of modules from the golden version program, which is a previous version of the program that is defect-free, and the module set substitution order is performed in a sequence, based on the highest priority value to the lowest priority value and continues until a module set substitution results in an absence of the defect.

In response to determining that the defect is absent in running the new version program with substitution of the module set, one or more processors substituting an individual module included in the identified module set in sequence order of highest priority value to lowest priority value.

In response to determining that an identified module included in the identified module set substituted by a corresponding module of the golden version program results in the absence of the defect, the one or more processors substituting a procedure set from the golden version program for the procedure set of the identified module, based on the priority value determined for the set of procedures, and in response to determining that an identified procedure set included in the identified module substituted by a corresponding procedure et of the golden version program results in the absence of the defect, one or more processors substituting a procedure of the identified procedure set from the golden version program for the corresponding procedure of the new version program, based on the priority value determined for the procedure, wherein the substitution order sequences from procedures with the highest priority value to the lowest priority value.

DETAILED DESCRIPTION

Figure 1:
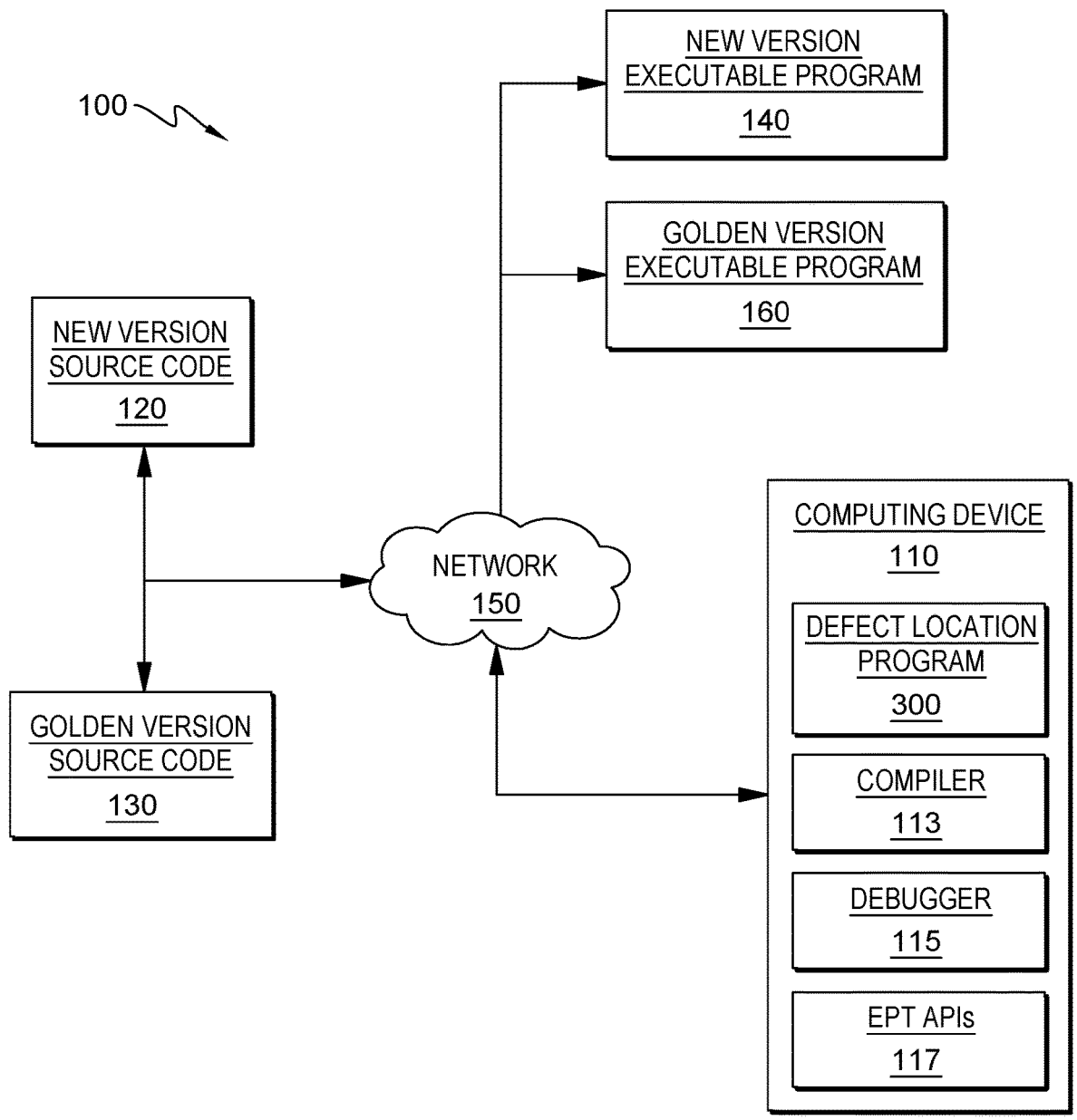
FIG. 1 is a functional block diagram illustrating a distributed application testing environment, in accordance with an embodiment of the present invention.

Embodiments of the present invention recognize that software applications can be updated with changes and new additions to the programming code and often include defects or errors in the code causing program function previously performing correctly to fail or result in errors. Large and complex applications may have multiple modules and thousands of lines of code, making locating code defects of upgraded programs difficult. Embodiments recognize that the difficulty is greater when developers need to read and correct program code written by other developers.

Embodiments of the present invention recognize that software applications include modules that are separate distinguishable components of the program, may be independently developed, and each module may perform a particular set of operations. Complex software applications can have large numbers of modules and new versions of the application can include updates and additions to one or several of the modules, including deletions and replacements. Embodiments recognize that modules include one or more procedures that are sets of programming instructions that perform specific tasks. Modules and procedures are often arranged programmatically to be called or initiated by including corresponding terms as function arguments, such as including a term "P2" defined to correspond to a procedure of a particular module.

Embodiments of the present invention also recognize that new versions of an application program have previous versions that have been tested and debugged, in which identified defects have been located and corrected. The defect-free previous version of code immediately prior to the new version of the program code is often referred to as golden code or a golden version of the program.

Embodiments of the present invention provide a method, computer program product, and computer system for locating a defect in a new version program of a software application program. Embodiments apply a substitution methodology and include a prioritization of substitutions to narrow the defect scope to the procedure level by referencing components of a golden version of the software application. Embodiments selectively substitute a set of modules of a golden version of the software application code for corresponding modules of the new version of the program, based on priority values determined and the module call sequence provided by a call tracing tool. Embodiments further substitute modules within the set of modules, again based on priority values, and similarly repeat substitutions at the procedure level for the module identified as including the defect.

Embodiments of the present invention include a new version of a software application that includes possible changes, additions, and deletions of programming code of a previous, error-free version of the same software application. The new version of the software application is referred to, herein, as the new version program, and the previous error-free version of the same software application, without edits included in the new version, is referred to, herein, as the golden version program. The use of the terms "software application", "application", and "program", herein, are used interchangeably.

In some embodiments, substitutions are enabled by the generation of entry point tables (EPTs) that assign an index number to respective procedures of modules for both the new version program and the golden version program. The EPTs are generated upon installation of executable instances of the respective programs in a development test environment that includes debugger functionality. Application programming interfaces (APIs) for EPTs create the EPTs, identify the respective modules and procedures with the modules, retrieve the memory locations of the respective procedures of each module, and assign the memory locations to an index number of the respective EPT for the new version and golden version of the software program.

The EPTs enable substitution of one or more golden version procedures for corresponding one or more procedures of the new version of the program. In some embodiments, the new version program is modified by replacing procedure calls in the source code with EPT index number calls that correspond to the respective procedures, such that the index number of the EPT is used in arguments to call the appropriate procedure. In some embodiments, the modifications to the source code are done by manual programming edits.

The executable new version program is run under the control of a debugger in the test environment, and the defect(s) are determined, usually by detecting deviation from expected outcomes of use cases. Based on priority values of module call sequences, a set of modules of the golden version are used to replace the corresponding set of modules in the new version program. The new version program is run in the test environment and checked for the presence or absence of the defect (or one of the defects if multiple defects exist). If the defect is still present, another set of modules are substituted based on priority value, and the process repeats until an individual module substitution eliminates the defect. Embodiments proceed with similar substitution steps at the procedure level for the identified module until an individual procedure substitution eliminates the defect and identifies the responsible procedure.

Embodiments of the present invention efficiently locate defects in the new version program by the use of calculating priority values for modules and procedures of the new version program. In some embodiments, factors related to potential defects in respective modules and procedures are determined, and weights are determined for the factors and assigned to the respective modules and procedures based on the contribution of the factors for the respective modules and procedures of the new version program.

In an example embodiment, an entropy weight method is used to determine the weight of each factor. Example factors may include: i) determining the lines of code in which changes were made for a respective module or procedure of the new version program; ii) quality assurance history of the prevalence of defects occurring in particular modules or procedures in previous version releases; iii) information from the call stack of modules and procedures present in the call stack when the defect occurs (if available); iv) the frequency in which a module or procedure is called as indicated by a static source code analyzer. Embodiments of the present invention may include additional or fewer factors considered in establishing weights for priority value calculations.

In some embodiments, factor-based weights are calculated and assigned to the modules and procedures of the new version program, and a tracing tool is applied to generate a module calling tree for the new version program and a procedure calling tree for a given module. The sequences of method calls and procedure calls within the new version program are determined and a calculated priority value based on factors considered, is applied to the sequences of modules to obtain an overall priority value for each set of modules in a sequence.

In some embodiments of the present invention, the set of module sequences having the highest priority value among all the sets of module sequences of the new version program is selected and replaced with the corresponding set of modules from the golden version executable program installed in the testing environment. The new version program includes the substituted set of modules and run, checking for the presence of the defect. If not found, the new version set of modules that were substituted with the golden version set of modules includes the defective code. If the defect remains, then the set of module sequences of the new version program having the next highest priority value is substituted by the corresponding set of module sequences from the golden version. The new version program with substituted modules is run and checked for the presence of the defect. The substitution methodology repeats until the new version program runs without the occurrence of the defect.

Having determined the set of modules from a trace sequence of module calls that includes the defect by selecting the highest priority value for the trace sequence set of modules, embodiments of the present invention repeat the substitution methodology for individual modules of the set of modules previously substituted in the new version program, followed by substitution of procedures of the individual module identified as including the defect. By substituting procedures in order, based on the highest priority value, the procedure producing the defect is identified.

The present invention will now be described in detail with reference to the Figures. FIG. 1 is a functional block diagram illustrating a distributed application testing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed application testing environment 100 includes computing device 110, new version of source code 120, golden version of source code 130, new version of executable program 140, and golden version executable program 160, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between server 110, Computing device 110 includes compiler 113, debugger 115, and EPT APIs 117 (entry point table application programming interfaces 117). In some embodiments, computing device 110 can be a blade server, a web server, a laptop computer, a desktop computer, a standalone mobile computing device, a smartphone, a tablet computer, or another electronic device or computing system capable of receiving, sending, and processing data. In other embodiments, computing device 110 may be a computing device interacting with applications and services hosted and operating in a cloud computing environment. In another embodiment, computing device 110 can be a netbook computer, a personal digital assistant (PDA), or other programmable electronic devices capable of compiling new version source code 120 and golden version source code 130, and performing debugging operations on new version executable program 140 and golden version executable program 160, as well as performing operations of defect location program 300. Alternatively, in some embodiments, computing device 110 may be communicatively connected to defect location program 300, operating remotely. Computing device 110 may include internal and external hardware components, depicted in more detail in FIG. 4.

Defect location program 300 is an application for efficiently locating a defect, sometimes referred to as a "bug", in a new version of a software program, such as new version executable program 140. Defect location program 300 employs a substitution methodology, selectively and sequentially replacing sets of module and procedure components of the new version program with corresponding modules and procedures of a golden version of the program in which a set includes one or more modules or one or more procedures. Defect location program 300 applies a priority value to modules and procedures of the new version program and selects a set of modules based on the priority values assigned to modules in a call sequence determined by tracing tool outputs of module and procedure calling trees. Defect location program 300 selects the set of modules with the highest priority value to substitute. When a set of modules (module set) substitution of golden version modules for new version modules results in the absence of the defect in the executed program, the defective code is determined to be within the set of modules of the new version program that were substituted.

Defect location program 300 substitutes the individual modules with the identified set of modules that includes the defective programming code, based on the priority values assigned to the modules. Defect location program 300 identifies the module that includes the defective programming code based on the absence of the defect as a result of golden version module substitution. Defect location program 300 proceeds to substitute procedures within the identified individual module following a similar selection of the procedure set having the highest priority value assigned, followed by the individual procedure within the procedure set that has been identified as including the defect. Identifying the individual procedure in which the defect source can be found significantly narrows the search for developers to correct the code errors resulting in the defect, saving time and resources.

Compiler 113 performs software operations that translate source code written in high-level languages into machine-readable instructions often referred to as machine code. Compiler 113 performs compiling operations on new version source code 120 and golden version source code 130, resulting in new version executable program 140 and golden version executable program 160, respectively. In embodiments of the present invention, compiler 113 performs compiling operations on new version executable program 140 subsequent to substitutions made to module sets, individual modules, and procedures to generate new version executable program 140 with module and procedure components substituted from golden version executable program 160 for the location of code that results in one or more defects in new version executable program 140.

Debugger 115 is a computer program software tool used to test, determine errors, and enable repair or correction of errors in the program code of software application development. Debugger 115 provides control over the testing and running of new version executable program 140 within distributed application testing environment 100. Debugger 115 enables both new version executable program 140 and golden version executable program 160 to be installed within distributed application testing environment 100, which allows defect location program 300 to perform module set, module, and procedure substitutions from golden version executable program 160 to new version executable program 140.

EPT APIs 117 is a set of application programming interfaces that are initiated by the installation of new version executable program 140 and golden version executable program 160 into distributed application testing environment 100 under control of debugger 115. EPT APIs 117 generates entry point tables for new version executable program 140 and golden version executable program 160 in which the memory addresses of the procedures for each module of the respective programs are included in the EPT and identified by an index number corresponding to the respective procedure memory address. EPT APIs 117 generates the EPT tables that enable the modifications made to procedure calls in new version source code 120 and golden version source code 130 to allow substitutions of module sets, individual modules, and procedures from golden version executable program 160 into new version executable program 140.

New version source code 120 is the text-based code for a newly developed version of the program included in distributed application testing environment 100. New version source code 120 includes updates and changes from a previous version of the same program, such as golden version source code 130. In embodiments of the present invention, new version source code 120 is created using one or more programming languages and is processed by compiler 113 of computing device 110 to generate new version executable program 140 in which a defect has been determined by debugger 115. New version source code 120 has been developed with an architecture that includes a plurality of modules, and one or more procedures included in respective modules.

Golden version source code 130 is the text-based programming code for a previous, error-free version of new version source code 120 without the updates and changes made to new version source code 120. In embodiments of the present invention, golden version source code 130 is created using one or more programming languages and is processed by compiler 113 of computing device 110 to generate golden version executable program 160, which is defect-free. Golden version source code 130 has been developed with an architecture that includes a plurality of modules, and one or more procedures included in respective modules.

In one embodiment of the present invention, new version executable program 140 is a compiled output of new version source code 120 processed by compiler 113 of computing device 110. New version executable program 140 is run in distributed application testing environment 100 under control of debugger 115 operating on computing device 110. In embodiments of the present invention, new version executable program 140 is run with use case input and includes one or more programming defects. In some embodiments, new version of code 120, golden version of code 130, new version executable program 140, and golden version executable program 160 can be hosted and/or stored on one or more respective computing devices (not shown). New version of code 120, golden version of code 130, new version executable program 140, and golden version executable program 160 are communicatively accessible to defect location program 300, compiler 113, debugger 115, and EPT APIs 117.

Figure 2:
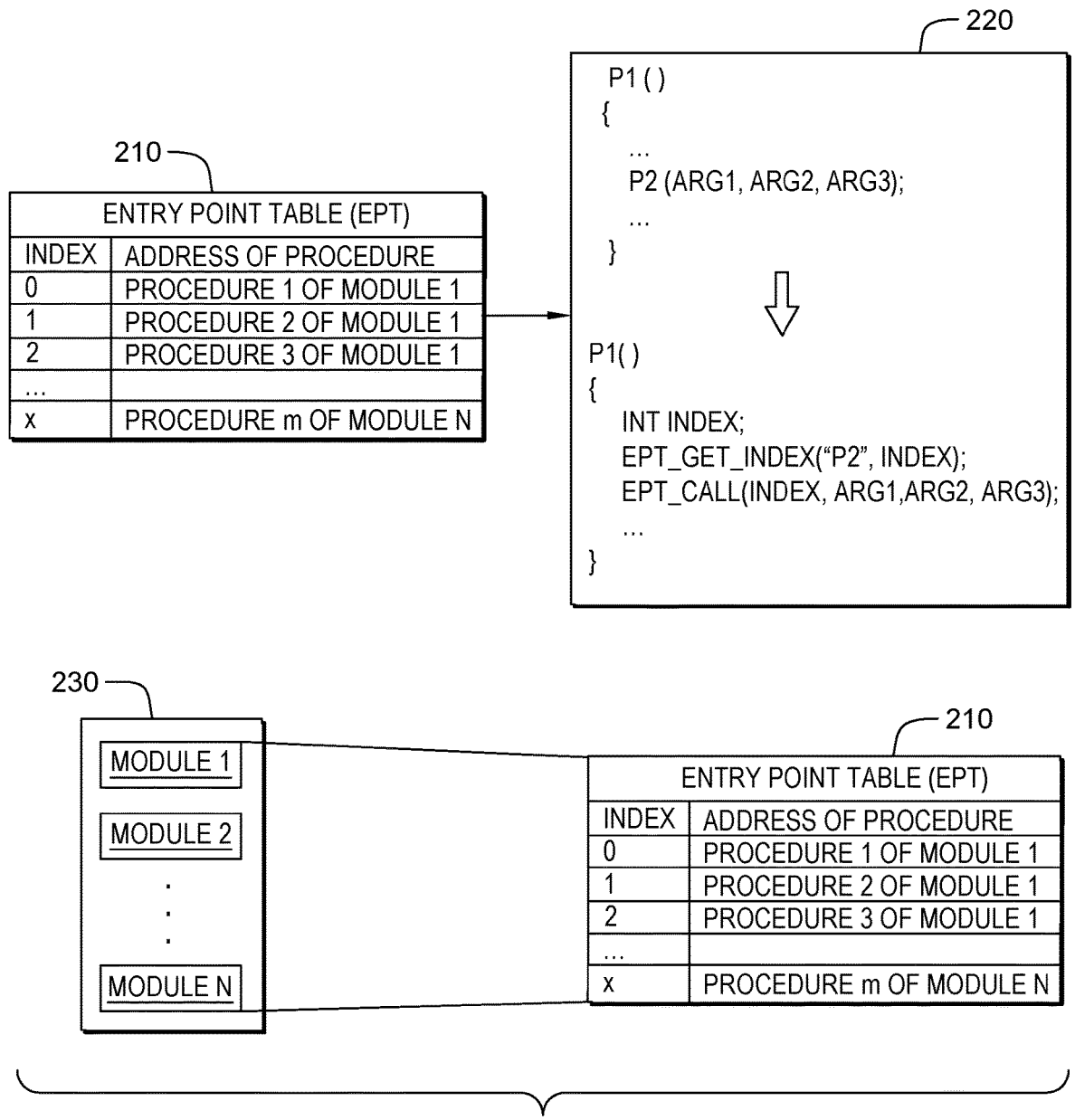
FIG. 2 depicts an example of a procedure call of application modules referenced by a corresponding index of an entry point table (EPT), in accordance with embodiments of the present invention.

FIG. 2 depicts an example of a procedure call of application modules referenced by a corresponding index of an entry point table (EPT), in accordance with embodiments of the present invention. Software applications, such as new version executable program 140 and golden version executable program 160, include multiple modules with one or more procedures comprising the respective module. FIG. 2 includes EPT 210, procedure call modification 220, and module list 230. EPT (entry point table) 210 is a programming structure, residing in the memory of computing device 110, and includes the memory addresses of procedures of the respective modules of new version executable program 140, for example. EPTs are generated by EPT APIs of defect location program 300 subsequent to the installation of compiled programs new version executable program 140 and golden version executable program 160.

The memory addresses of EPT 210 are represented in FIG. 2 by text identifying the procedures and the module in which the procedure is included, for example, procedure 1 of module 1. EPT 210 links the respective procedure addresses in memory with an index number, such as index number "0" for procedure 1 of module 1. EPT 210 is depicted as including procedure 0 of module 1 to procedure m of module N.

In embodiments of the present invention, when a procedure call is made within new version executable program 140, operating under control of debugger 115, the modified procedure call identifies the index number corresponding to the memory address of the procedure. EPT tables are generated by EPT APIs 117 for both new version executable program 140 and golden version executable program 160 as the respective versions are installed in the testing environment under the control of debugger 115. EPT 210 enables the substitution of a corresponding procedure from golden version executable program 160 into EPT 210 of new version executable program 140, which defect location program 300 uses to locate defects of new version executable program 140.

Procedure call modification 220 illustrates a change to a procedure call that enables calling a procedure by a corresponding index number. Procedure call modification 220 includes changes to the calling code such that the index number of EPT 210 is included in the procedure calling code. The structure and use of EPTs support the substitution of golden version procedure memory addresses for those of new version executable program 140 with only minor programming modifications, which can make use of an auto-replacement feature to simplify the modifications.

Module list 230 illustrates the plurality of modules associated with a software application, such as new version executable program 140 and golden version executable program 160. In some embodiments of the present invention, defect location program 300 initiates EPT APIs 117 to generate EPT 210 in response to the installation of new version executable program 140 and golden version executable program 160 in the development testing environment under the control of debugger 115. EPT 210 includes index numbers that correspond to the respective procedures of each module of the respective programs.

Figure 3:
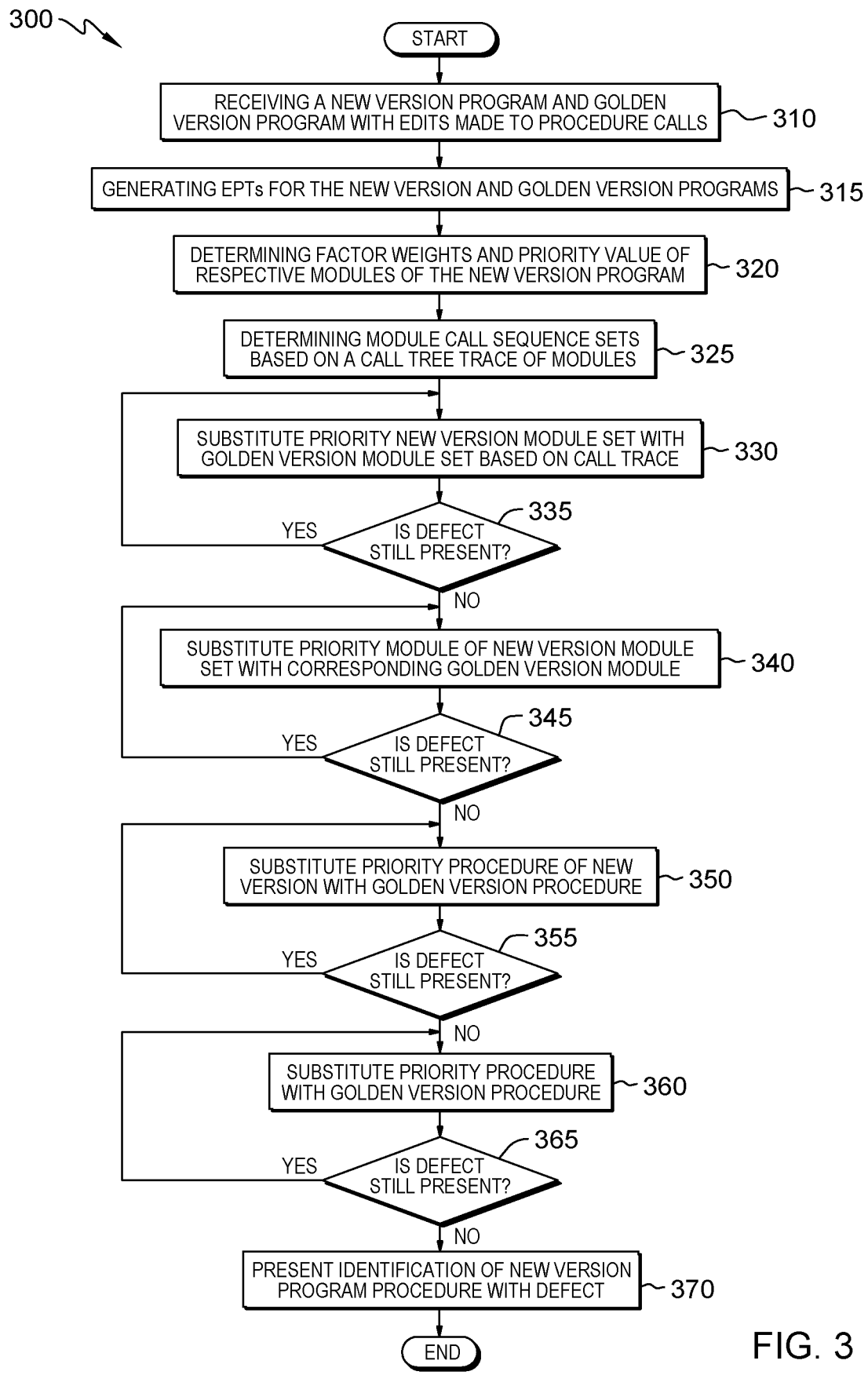
FIG. 3 is a flowchart depicting the operational steps of a defect location program operating in the distributed data processing environment of FIG. 1, in accordance with embodiments of the present invention.

FIG. 3 is a flowchart depicting the operational steps of defect location program 300 operating in the distributed application testing environment of FIG. 1, in accordance with embodiments of the present invention. In some embodiments, defect location program 300 locates a specific program's procedure in which a code error results in a defect detected by debugger 115 of computing device 110. Defect location program 300 performs substitutions of the memory addresses of procedure code from a golden version of the executable program code (e.g., golden version executable program 160) into a corresponding new version executable program code (e.g., new version executable program 140), based on the index numbers associated with module procedures in the EPTs of the golden and new version executable programs.

Defect location program 300 also includes an efficient methodology of selecting the module set, individual module, procedure set, and individual procedure to locate defects in the new version program code, based on calculating a priority value of modules and procedures, which includes determining factors identified as possibly related to defect occurrence.

Defect location program 300 receives a new version program and golden version program with edits made to procedure calls (step 310). Embodiments of the present invention include modifications made to the source code of a new version of a program and a golden version of the program that replaces the procedure calls of the program's modules with index numbers that correspond to the memory addresses of the modules' procedures. The programming modifications result in procedure calls that are based on reference to an entry point table (EPT) index that corresponds to a particular procedure's memory address. In some embodiments, the modification is performed manually. In other embodiments, the modifications make use of automated or assisted replacement of code elements. Defect location program 300 receives source code with modifications performed that enable procedure calls from EPTs for a new version of a program and a golden version of the program.

For example, defect location program 300 receives new version source code 120 and golden version source code 130. New version source code 120 and golden version source code 130 have been modified such that the procedure calls include a reference to an index number of an EPT for the respective source code, and the index number corresponds to a memory address at which the procedure being called is stored.

Defect location program 300 generates EPTs for the new version and golden version programs (step 315). Defect location program 300 includes EPT APIs that are initiated in response to detecting an executable version of a program loaded into a testing environment with control by a debugger. Defect location program 300, through the EPT APIs, builds an EPT as a data structure that associates an index number with a program procedure's memory address. In some embodiments, the EPT APIs obtain the memory addresses of all procedures for all modules of the respective executable programs (i.e., new version and golden version) and include the memory addresses in the respective EPT associated with an index number.

Defect location program 300 generates EPTs for the new version executable program and the golden version executable program, such that the index numbers of procedures in the golden version program EPT match the index numbers of the corresponding procedures in the EPT of the new version program, enabling substitution of similar procedures. The modifications previously made to the respective source code of the new version and golden version programs replace the direct procedure calls with the respective programs with index numbers of the EPTs to obtain the memory addresses of procedures and perform the program operations.

For example, defect location program 300 determines that new version executable program 140 and golden version executable program 160 are installed in distributed application testing environment 100 under control of debugger 115. Defect location program 300 initiates EPT API's 117 to build EPTs for new version executable program 140 and golden version executable program 160. EPT APIs 117 obtains the memory addresses of the procedures for the modules of the respective programs and includes the memory addresses in the respective EPTs. The compiled code of new version executable program 140 and golden version executable program 160 includes the modifications that have replaced the procedure calls with index numbers of the respective EPT that corresponds to the procedure's memory address.

Defect location program 300 determines factor weights and priority values of respective modules and procedures (step 320). Defect location program 300 receives input that identifies factors that contribute to the likely occurrence of a defect within a module set, module, procedure set, or procedure. In example embodiments, defect location program 300 can calculate and apply weights for factors to respective modules and procedures of the new version executable program, such as new version executable program 140.

Embodiments of the present invention are not limited by the number of factors considered. Factors considered to have a relationship for possible defect occurrence may include, for example, modules and procedures in which large amounts of code changes have been made, often determined by a line of code updates metric, program version quality assurance history identifying modules and procedures in which there are historic instances of defects occurring, identifying modules and procedures present in a call stack when the defect occurs, and a frequency of which modules and procedures are called in the operation of the program.

Applicability and degree of factors are determined for each module and procedure, and a weight for each of the factors are calculated and assigned to the respective modules and procedures. Weight determining methodologies may be applied to calculate a priority value for the respective module sets, individual modules, procedure sets, and individual procedures of the new version executable program. An example weight determination methodology is the entropy weight method (EWM); however, embodiments of the present invention are not limited to one approach of determination and assignment of weights to modules and procedures of the new version executable program.

For example, factors considered as possibly contributing to the occurrence of one or more defects within a module or procedure of new version executable program 140 include: i) the number of lines of code changes made within a module or within a procedure, ii) the quality assurance history of previous defects found within modules and/or procedures, iii) the presence of modules and procedures within a call stack at the occurrence of a defect, and iv) the number of calls made to a particular module or procedure. The factors are each given a weighting range and the weights for each module and procedure are calculated, for example, by using the entropy weight method. The calculated weight provides a priority value that is used for the selection of module sets (by combining the weighted values of each module of the module set), individual modules, procedure sets (by combining the weighted values of each procedure of the procedure set), and individual procedures of new version executable program 140.

Defect location program 300 determines call sequences of module sets and procedure sets based on call tree traces (step 325). Defect location program 300 receives information regarding the module calling tree of the executable program from the output of a tracing tool applied to the new version program. The tracing of the module calling tree provides the module sets of sequential calls of modules during the operation of the new version executable program. A particular sequence of module calls defines a module set, and the module sets are determined for the new version executable program. A module set includes all the procedures of each module of the module set, which are performed in a particular sequence. Substitution of a module set includes the substitution of all the procedures of all the modules in the module set.

Defect location program 300 also determines procedure sets based on the procedure calling tree output from call tracing tools applied to the new version executable program. Procedure sets include a sequence of the procedure calls as performed in the new version executable program. Each procedure set includes one or more individual procedures performed in a specific sequence.

For example, defect location program 300 receives output from tracing tools that include a module calling tree indicating a calling sequence. The calling sequence indicates modules included in respective sets. In presented examples, modules are represented by "M" and a number. The tracing tool identifies the module sets of M1; M2-M3-M10-M4; M8-M9-M10; M5-M10; M6, M7, M10, as module sets for new version executable program 140. Defect location program 300 also determines procedure sets from trace tool output of a procedure call tree for new version executable program 140.

Defect location program 300 substitutes the priority value module set of the new version executable program with the corresponding module set from the golden version executable program (step 330). Defect location program 300 cumulatively combines the priority values of each module of the module sets determined from the received module calling trees. The combination results in an overall priority value for each respective module set. Defect location program 300 determines the module set of the executable new version program that has the greatest priority value among the plurality of module sets and substitutes the modules of the greatest priority value module set with the corresponding modules from the golden version executable program. The golden version executable program has previously been verified as defect-free and, therefore, substituting the module set from the golden version executable program for the module set of the new version executable program will have the effect of removing the defect, if the defect is located within the original module set of the new version executable program. The new version executable program includes the module set substitution and runs within the testing environment.

Embodiments of the present invention substitute the memory addresses of the procedures associated with modules in the respective EPTs for the new version executable program (hereafter, referred to more simply as the new version program), and the golden version executable program (hereafter, referred to more simply as the golden version program). For clarity of the features of embodiments of the present invention, the EPT substitutions made by defect location program 300 are acknowledged as replacing the memory address of procedures in the EPT of the new version program with the EPT memory address of corresponding procedures of the golden version program.

For simplification, hereafter, substitutions are referred to by omitting the "memory address" term and including the procedure terms as they apply to procedure substitutions of module sets, individual modules, procedure sets, and individual procedures of the new version program that includes the defect(s) with corresponding procedures from the golden version program that is defect-free. The procedures correspond to an index number of the respective EPT, such that the procedure of the new version program corresponding to index 0, if substituted, is replaced or swapped with the EPT procedure of the golden version program corresponding to the same index, 0.

Defect location program 300 performs the substitution by replacing the procedures of the new version program that are included in the module set determined by defect location program 300 to have the greatest priority value. Defect location program 300 substitutes the procedures of the module set of the new version program with the procedures of the same module set and same EPT index number of the golden version program. Defect location program 300 performs the substitution of the respective golden version program procedures into the corresponding index position of the EPT of the new version program.

For example, defect location program 300 determines the module set of M2-M3-M10-M4 as having the greatest priority value of 2.3, with all other module sets having priority values below 2.3. Defect location program 300 substitutes the procedures within modules M2, M3, M10, and M4 of golden version executable program 160 into the EPT of new version executable program 140, replacing the procedures for modules M2, M3, M10, and M4 of new version executable program 140 with defect-free procedures for the same modules M2, M3, M10, and M4, from golden version executable program 160.

Defect location program 300 determines whether the defect is still present in the new version program (decision step 335). Defect location program 300 determines whether the new version program with a substituted module set from the golden version program still exhibits the defect. For the case in which defect location program 300 determines that the defect is still present (step 335, "YES" branch), defect location program 300 returns to step 330 and substitutes the procedures of the next module set having the next highest priority value of the new version program with the corresponding procedures of the next module set of the golden version program (step 330) and proceeds as described above. Steps 335 and 330 are repeated until a module set substitution results in the absence of the defect occurrence, indicating the defect is within the code of one of the modules of the module set.

For the case in which defect location program 300 determines that the defect is no longer present (step 335, "NO" branch), defect location program 300 substitutes the priority module of the new version module set with the corresponding golden version of the module (step 340). Defect location program 300 identifies the substituted module set of the new version program as including the defective code, which is referred to, hereafter, as the "identified module set". Defect location program 300 substitutes the module that has the greatest priority value of the identified module set of the new version program, with the corresponding golden version module (step 340).

In some embodiments, defect location program 300 resets the EPT of the new version program with the original procedures for the modules of the identified module set that were substituted with the corresponding golden version procedures. Defect location program 300 determines the particular module of the identified module set that has the greatest priority value and substitutes the EPT procedures of the particular module of the new version program with the procedures of the corresponding module of the golden version program.

Embodiments of the present invention recognize that alternatively, the defect can also be located by substitution of the module sets, modules, procedure sets, and procedures from the new version program EPT to the EPT of the golden version program, compiling the golden version program with substituted procedures and checking for the occurrence of the defect. The alternative embodiment identifies the module within the module set in which the defective code is located, by restoring the original new version program procedures for the module that has the greatest priority value and determining whether the defect returns. The subsequent discussions of defect location program 300 assume a reset of the original new version program procedures prior to subsequent substitutions, however, embodiments of the present invention recognize that identification of modules, procedure sets, and procedures that include code resulting in the defect can also be accomplished by substituting new version program procedures from the new version program EPT into the EPT of the golden version code and determining whether the defect appears.

Defect location program 300 determines whether the defect is still present (decision step 345). Defect location program 300 determines whether the defect is still present subsequent to the substitution of the procedures of a known defect-free module from the EPT of the golden version program for corresponding procedures of the EPT of the new version program. For the case in which defect location program 300 determines that the defect is still present (step 345, "YES" branch), defect location program 300 returns to step 340 and substitutes the module with the next highest priority value of modules in the previously identified module set (step 340) and proceeds as described above, repeating substitutions with the procedures of the module with the next-greatest priority value, until the defect is no longer present.

For example, defect location program 300 determines that module two (M2) has the greatest priority value of the modules included in the identified module set. Defect location program 300 substitutes the procedures of module 2 from the EPT of the golden version program into the EPT of the new version program and runs the new version program with the substituted procedures, checking for whether the defect is present. If the defect remains, defect location program 300 proceeds to substitute the procedures of the next-greatest priority value module of the identified module set, runs the new version program with the substituted procedures, and checks for whether the defect is still present.

For the case in which defect location program 300 determines that the defect is no longer present (step 345, "NO" branch), defect location program 300 substitutes the procedure set of the new version identified module that has the greatest priority value with the corresponding golden version procedure set (step 350). The procedure sets of the new version program have been determined by tracing tools generating procedure calling trees for the new version program. Defect location program 300 determines the procedure set of the identified module of the new version program that has the greatest priority value as determined by the cumulative priority value of the individual procedures of the procedure set. Defect location program 300 substitutes the procedures that correspond to the procedure set of the new version program that has the greatest priority value from the EPT of the golden version program into the corresponding index of the EPT of the new version program.

For example, defect location program 300 determines the identified module of the new version program that includes the defect. Defect location program 300 identifies the procedure sets of the identified module from the procedure calling tree produced by tracing tools for new version executable program 140. Defect location program 300 determines that a sequence of procedures (P) identified by a sequence of procedure numbers that has the greatest priority value is P6-P7-P10-P5-P8-P9-P5. Defect location program 300 substitutes the P6-P7-P10-P5-P8-P9-P5 procedures from the EPT of golden version executable program 160 with the corresponding procedures in the EPT of new version executable program 140.

Defect location program 300 determines whether the defect is still present (decision step 355). Defect location program 300 runs the new version program with the substituted procedures for the identified module and determines whether the defect is still present. For the case in which defect location program 300 determines that the defect is still present (step 355, "YES" branch), defect location program 300 returns to step 350 and substitutes the procedure with the next-greatest priority value of the previously identified module (step 350) and proceeds as described above.

For the case in which defect location program 300 determines that the defect is no longer present (step 355, "NO" branch), defect location program 300 substitutes the priority procedure of the identified procedure set of the new version program with the corresponding golden version program procedure (step 360). Defect location program 300 determines the priority values of the procedures within the identified procedure set and selects the procedure that has the greatest priority value and substitutes the corresponding golden version procedure from the golden version program EPT to the EPT of the new version program. Defect location program 300 checks for whether the defect remains subsequent to compiling and running of the new version program with the substituted procedure.

For example, defect location program 300 determines that the procedure set with the next-greatest priority value includes the defective code. The identified procedure set includes procedures P1, P2, P3, and P5. Defect location program 300 determines that procedure two (P2) has the greatest priority value, and substitutes procedure two from the EPT of the golden version program into the EPT procedure two positions of the new version program. The new version program is run, and defect location program 300 checks for whether the defect is still present.

Defect location program 300 determines whether the defect is still present (decision step 365). For the case in which defect location program 300 determines that the defect is still present (step 365, "YES" branch), defect location program 300 returns to step 360 and selects the procedure of the identified procedure set that has the next greatest priority value and substitutes the golden version procedure from the EPT of the golden version program that corresponds to the procedure in the EPT of the new version program having the next greatest priority value, and proceeds as described above.

For the case in which defect location program 300 determines that the defect is no longer present, defect location program 300 presents the identification of the new version program procedure with the defect (step 370). Defect location program 300 identifies the individual procedure substitution that removed the occurrence of the defect in the new version program. In some embodiments, defect location program 300 may present a detailed substitution history, highlighting the final procedure substitution to identify the location of the defective code to augment developer debugging. In some embodiments, defect location program 300 may present an alert or notification displayed on a user interface of computing device 110. By applying priority values to modules and procedures of the new version program based on factor weighting techniques, defect location program 300 provides a technological improvement in debugging upgrades and new versions of existing program code, effectively and efficiently locating the procedure in which defective code is found, and avoiding excessive steps of substitution, re-compiling, and checking for the presence of the defect.

Having located the defect in an individual procedure of the new version program, defect location program 300 ends.

Figure 4:
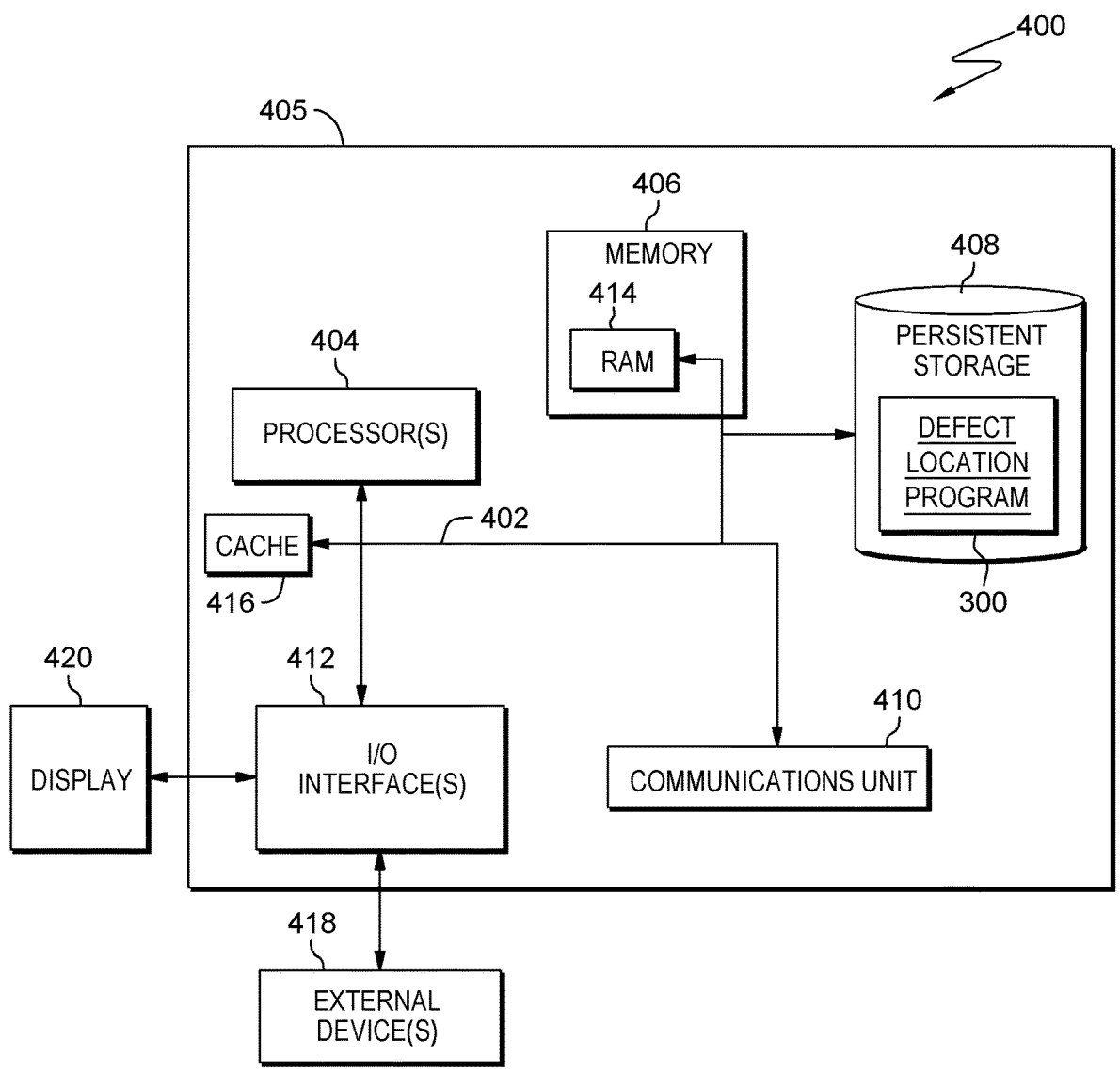
FIG. 4 depicts a block diagram of components of a computing system, including a computing device configured to operationally perform the defect location program of FIG. 3, in accordance with an embodiment of the present invention.

FIG. 4 depicts a block diagram of components of computing system 400, including computing device 405, configured to include or operationally connect to components depicted in FIG. 1, and with the capability to operationally perform defect location program 300 of FIG. 2, in accordance with an embodiment of the present invention.

Computing device 405 includes components and functional capability similar to components of computing device 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, defect location program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Defect location program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., defect location program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or the other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for locating a defect in a new version of a software program, the method comprising:

receiving, by one or more processors, source code of a golden version program and source code of a next version program, both modified to direct procedure calls within the respective programs to index numbers in an entry point table (EPT), each index number corresponding to a respective procedure memory address;

compiling, by the one or more processors, into an executable form respectively, the next version program and the golden version program, wherein the executable form of the next version program includes at least one defect, and wherein the executable form of the golden version program is defect-free;

generating, by the one or more processors, a first entry point table (first EPT) of the executable new version program and a second entry point table (second EPT) of the executable golden version program;

performing, by the one or more processors, a first substitution of a series of substitutions of sets of procedures between memory addresses of the second EPT of the executable golden version program and corresponding memory addresses of the first EPT of the executable new version program followed by running a respective executable program that includes the first substitution, wherein substituted procedures are identified, respectively, by matching index numbers in respective entry point tables; and identifying, by the one or more processors, an individual procedure determined to produce the defect by performing a substitution until a change in a presence of the defect is detected, and otherwise proceeding to a next substitution.

2. The method of claim 1, wherein the new version program is a next consecutive program updated from the golden version program.

3. The method of claim 1, wherein an index number of a procedure of the second EPT corresponds to a same index number of a similar procedure of the first EPT, and procedures of the modules of the first EPT correspond to procedures and modules of the second EPT and include corresponding index numbers.

4. The method of claim 1, wherein the first EPT and the second EPT are generated, based on an EPT application programming interface (API) detecting an installation of the executable new version program and the executable golden version program in a test environment.

5. The method of claim 1, wherein the sets of procedures of the new version program are determined by receiving a sequence tree of modules and a sequence tree of procedures included within respective modules, from a tracing tool.

6. The method of claim 1, wherein the substitutions of the sets of procedures are procedures from the second EPT of the golden version program to the first EPT of the new version program, and the executable new version program is run to determine if the defect is no longer observed.

7. The method of claim 1, wherein the substitutions of the sets of procedures are procedures from the first EPT of the new version program to the second EPT of the golden version program, and the executable golden version program is run to determine if the defect appears.

8. The method of claim 1, further comprising:
assigning, by the one or more processors, a priority weight based on one or more factors associated with a probable occurrence of the defect; and
performing, by the one or more processors, a selection of modules and procedures in an order of substitution by selecting respective modules and procedures based on the priority weight.

9. The method of claim 1, wherein the series of substitutions of procedures includes an order of a module set, an individual module of the module set, a procedure set of the individual module, and an individual procedure of the procedure set.

10. A method for a substitution order of procedures of a new version of a program producing a defect, the method comprising:
determining, by one or more processors, factors associated with a new version program related to an occurrence of a defect;
generating, by the one or more processors, for an executable form of the new version program, a module call tree, and for respective modules, a procedure call tree;
determining, by the one or more processors, a substitution priority value for respective procedures of respective modules of the executable form of the new version program, based on a factor-dependent weight to the respective procedures;
substituting sequentially, sequentially, by the one or more processors, into an executable new version program, a set of modules identified by the module call tree from a golden version program that is defect-free, and running the executable new version program with an incremental substitution, until the defect is absent;
substituting sequentially, by the one or more processors, into an original instance of the executable new version program, individual modules of the set of modules that produced a defect-free result from the golden version program, and running the executable new version program with the incremental substitution, until the defect is absent;
substituting sequentially, by the one or more processors, into the original instance of the executable new version program, individual procedures of the set of procedures that produced the defect-free result from the golden version program, and running the executable new version program with the incremental substitution, until the defect is absent;
wherein sequential substitution selections are based on a substitution order of highest priority value to lowest priority value; and
identifying the procedure producing the defect.

11. The method of claim 10, wherein the module call tree and procedure calling tree is generated by a program tracing tool.

12. The method of claim 10, further comprising:
determining, by the one or more processors, the factors contributing to the occurrence of the defect;
determining, by the one or more processors, the weight of each factor for each module and each procedure;
determining, by the one or more processors, the priority value by summation of weights of each factor for the respective modules and the respective procedures; and
determining, by the one or more processors, the priority value of the set of modules and the set of procedures by summation of priority values of individual modules of the set of modules, and priority values of individual procedures of the set of procedures.

13. The method of claim 10, wherein the factors associated with the respective modules and the respective procedures of the respective modules of the new version program include one or a combination selected from a group consisting of: a number of changed lines of code; a number of instances of defects as determined from program history; a presence within a call stack when the defect occurs; and a number of instances in which a procedure is called by other procedures.

14. The method of claim 10, wherein the weights used in a determination of the priority values for modules and procedures of the new version program are generated by use of an entropy weight method.

15. The method of claim 10, wherein the module call tree and the procedure call tree indicate a sequence in which the respective modules and the respective procedures of the respective modules are called during operation of the new version program.

16. A computer system for locating a defect in a new version of a software program, the computer system comprising:
one or more computer processors;
one or more computer-readable storage media, and program instructions stored on the one or more computer-readable storage media, the program instructions comprising:
program instructions to receive source code of a golden version program and source code of a next version program, which are modified to direct procedure calls within respective programs to index numbers in an entry point table (EPT), each index number corresponding to a respective procedure memory address;
program instructions to compile into an executable form respectively, the next version program and the golden version program in which the executable form of the next version program includes at least one defect, and wherein the executable form of the golden version program is defect-free;

program instructions to generate a first entry point table (first EPT) of an executable new version program and a second entry point table (second EPT) of an executable golden version program, program instructions to perform a first substitution of a series of substitutions of sets of procedures between the second EPT of the executable golden version program and the first EPT of the executable new version program, followed by running a respective executable program that includes the first substitution, wherein substituted procedures are identified, respectively, by matching index numbers in respective entry point tables; and program instructions to identify an individual procedure determined to produce the defect by performing a substitution until a change in a presence of the defect is detected, and otherwise proceeding to a next substitution.

17. The computer system of claim 16, wherein the sets of procedures of the new version program are determined by program instructions to receive a module calling tree sequence, and a procedure calling tree sequence of procedures included within respective modules, from a tracing tool.

18. The computer system of claim 16, further comprising:
program instructions to assign a priority weight based on one or more factors associated with a probable occurrence of the defect; and program instructions to perform a selection of modules and procedures in an order of substitution by selecting respective modules and procedures based on the priority weight.

19. The computer system of claim 16, wherein the series of substitutions of procedures includes an order of, a module set, an individual module of the module set, a procedure set of the individual module, and an individual procedure of the procedure set.

20. The computer system of claim 16, further comprising program instructions, stored on the computer-readable storage media for execution by at least one of the one or more processors, to:

determine factors associated with the new version program related to an occurrence of the defect;

generating, by the one or more processors, for an executable form of the new version program, a module call tree, and for respective modules, a procedure call tree;

determine a substitution priority value for respective procedures of respective modules of the executable form of the new version program, based on a factor-dependent weight of to the respective procedures;

substitute sequentially a set of modules from the executable golden version program that produced a defect-free result into an original instance of the executable new version program, and running the executable new version program with the incremental substitution, until the defect is absent;

substitute sequentially into an original instance of the executable new version program, individual modules of the set of modules that produced a defect-free result from the executable golden version program, and running the executable new version program with the incremental substitution until the defect is absent;

substitute sequentially into the original instance of the executable new version program, individual procedures of an individual module that produced the defect-free result from the executable golden version program, and running the executable new version program with the incremental substitution, until the defect is absent;

wherein sequential substitution selections are based on a substitution order of highest priority value to lowest priority value; and identifying the procedure producing the defect.

* * * * *